June 24, 1958  W. WERNER ET AL  2,840,313

TRANSFER MECHANISM FOR CALCULATING MACHINES

Filed Feb. 9, 1954

INVENTORS
Walter WERNER and
Willi SCHLEGEL
BY
Attorney

United States Patent Office 2,840,313
Patented June 24, 1958

2,840,313

TRANSFER MECHANISM FOR CALCULATING MACHINES

Walter Werner and Willy Schlegel, Leipzig, Germany, assignors to Triumphator-Werk Veb, Molkau, near Leipzig, Germany Application February 9, 1954, Serial No. 409,207

6 Claims. (Cl. 235—138)

This invention relates to a tens carry device, particularly for calculating machines and the like, in which the tens carry lever enclosing with an elongated hole the intermediate wheel shaft is elastically secured in its end positions to this shaft, and the object of the invention is to provide a simple and space-saving springy securing or locking device for this purpose.

One of the known securing devices of this class comprises a pin fitted with an edge engaging a bore of the tens carry lever which is pressed outwardly against the intermediate wheel shaft by a spiral spring. It is further known to fix such securing pins to the casing and have them act on the carry lever, and it is also known to use spring weighted pawls instead of locking pins.

These known types of securing means are, however, uneconomical, because they consist of a plurality of single parts the production of which requires the employment of several machine tools.

This drawback is eliminated according to the invention by the provision of a securing or locking device consisting of a flat or wire spring. Contrary to the known devices, the novel locking means comprises only a single piece which can be produced by the exclusive use of bending tools and held in position in a very simple manner. The locking device is generally constructed as compression spring with its ends reacting in the same plane, though it may also be bent or offset to utilize space, the point of support and the operating point being then displaced relative to each other.

The device according to the invention may be used also with an intermediate wheel sleeve or with a tens carry lever secured in end position to the machine frame.

The spring forming the securing or locking device can be inserted either between the casing and the tens carry lever or between the lever and the intermediate shaft. To prevent it from jumping out the spring is preferably fixed at one end in any suitable manner, for instance by spot-welding, riveting or flaps, etc.

As it is only slightly stressed, the cross section of the spring may be small so as to take up little space and thus permit reduction of the size of the machine and of the inert mass of its operating members. Moreover, owing to this arrangement, it becomes possible to use stamped and bent sheet metal parts instead of the thick-walled tens carry levers milled from heavy material as required hitherto for the locking pins, whereby weight as well as manufacturing cost will be lowered. The locking spring is preferably held by bent or stamped sheet flaps.

A particularly small yet strong securing device according to the invention can be obtained by giving the locking spring the form of a ring provided with two adjacent depressions corresponding to the circumference of the intermediate wheel shaft or to that of a sleeve arranged thereon to adjust, for instance, the tens carry lever in axial direction. The spring is then held on the lever in such manner that at times one of the depressions lies against the intermediate wheel shaft or the sleeve thereof.

A still more suitable, safe and, from the manufacturing point, cheaper securing device can be produced by using a U-shaped flat or wire spring which possesses a small loop and embraces with its two sides the intermediate wheel shaft. The loop serves for fastening the spring to the tens carry lever by being placed over a small elevation of the same preferably produced during stamping of the lever by pressing or by means of a small riveted bolt or by welding. When the tens carry lever advances the spring easily slides over the intermediate wheel shaft and non-positively holds the lever in position by its two sides bearing against the shaft behind the center thereof. Owing to this arrangement, the space between the tens carry levers is reduced still more.

By way of example, the invention is illustrated in the accompanying drawing, wherein Figure 1 shows an embodiment, in which the locking spring secured to the tens carry lever acts directly on the intermediate wheel shaft;

Figure 1:
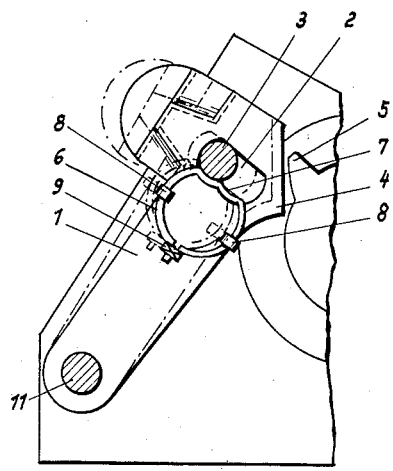
Figure 2:
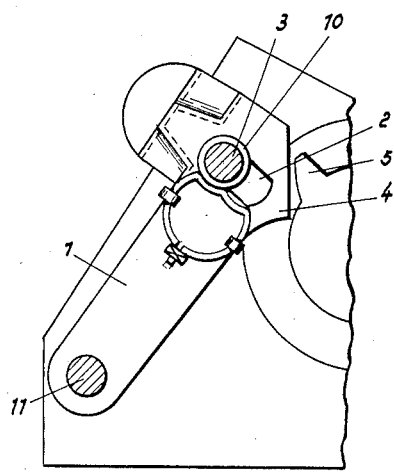
Fig. 2 shows an arrangement, in which the locking spring secured to the tens carry lever acts on a sleeve disposed on the shaft.

Referring to the drawing, the tens carry lever 1 enclosing with its oblong hole 2 the intermediate wheel shaft 3 is made of sheet metal, and the cam 5 bears against the control side 4 of the lever 1. For limiting the lift of the lever 1 and securing its end positions serves the locking spring 6 which consists of flat or wire material and forms a ring provided with two depressions or inward bulges 7 and fastened to the lever 1 by means of the bent flap 8 and the pressed through supporting flap 9 in such manner that the inward bulges 7 bear against the shaft 3 (Fig. 1) or a spacing sleeve 10 arranged thereon (Fig. 2).

Figure 3:
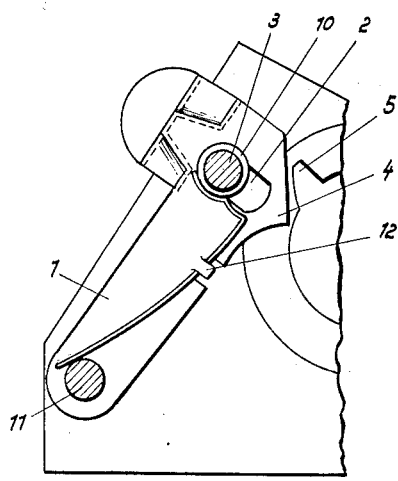
Fig. 3 shows a modified locking spring.

In the arrangement according to Fig. 3 the locking spring consists of an angular piece of spring wire the longer side of which is clamped between the bearing shaft 11 of the tens carry lever 1 and the holding flap 12 provided thereon while the shorter side thereof having two depressions lies against the sleeve 10 of the shaft 3. If necessary, additional means may be employed to prevent displacement, turning or jumping out of the spring.

Figure 4:
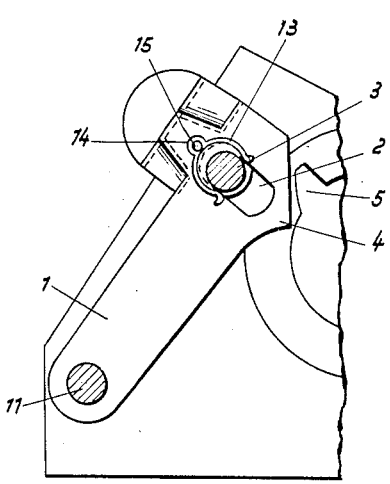
Fig. 4 shows a U-shaped locking spring.

In the embodiment according to Fig. 4 the tens carry lever 1 is secured in end position by the spring 13 which limits also its stroke. The spring 13 is U-shaped in the manner of a hairpin and possesses at the center of its closed portion a loop 14 by means of which the spring is held on a small elevation 15 pressed out of the lever 1 or riveted thereto or welded thereon.

We claim:

1. Tens carry device for calculating machines, comprising, in combination, an oblongly apertured tens carry lever, a bearing shaft on which the lever is pivotally mounted, an intermediate wheel shaft passing through an aperture of the lever and a locking spring member made of spring steel wire or band steel and mounted on the lever, said member contacting the intermediate wheel shaft and thereby holding the lever in either of two adjusted positions.

2. Tens carry device according to claim 1, in which the locking member forms a ring having two adjacent inward bulges corresponding to the circumference of the intermediate wheel shaft, said ring being held on the lever by engaging the shaft with one of its bulges.

3. Tens carry device according to claim 1, in which the locking member forms a ring having two adjacent inward bulges corresponding to the circumference of a sleeve of the intermediate wheel shaft, said ring being held on the lever by engaging the sleeve of the shaft with one of its bulges.

4. Tens carry device according to claim 1, in which holding and supporting flaps for the locking member are provided on the lever.

5. Tens carry device for calculating machines, comprising, in combination, an oblongly apertured tens carry lever, a bearing shaft on which the lever is pivotally mounted, an intermediate wheel shaft passing through the aperture of the lever, an elevation on the lever and a locking member elastically securing the lever in its end position on the shaft, said locking member consisting of a U-shaped flat spring engaging with its fastening loop said elevation on the lever.

6. Tens carry device according to claim 5, in which the U-shaped spring is made of spring wire.

References Cited in the file of this patent

UNITED STATES PATENTS

| | | |
|---|---|---|
| 1,355,565 | Odhner | Oct. 12, 1920 |
| 1,760,347 | Craig | May 27, 1930 |
| 2,043,279 | Brown | June 9, 1936 |
| 2,638,015 | Shoelles | May 12, 1953 |

FOREIGN PATENTS

| | | |
|---|---|---|
| 563,643 | France | Dec. 10, 1923 |